United States Patent
Renaud et al.

[11] Patent Number: 5,958,051
[45] Date of Patent: Sep. 28, 1999

[54] IMPLEMENTING DIGITAL SIGNATURES FOR DATA STREAMS AND DATA ARCHIVES

[75] Inventors: Benjamin J. Renaud, Woodside; John C. Pampuch, Morgan Hill; Avril E. Hodges Wilsher, Palo Alto, all of Calif.

[73] Assignee: Sun Microsystems, Inc., Palo Alto, Calif.

[21] Appl. No.: 08/780,817

[22] Filed: Jan. 9, 1997

Related U.S. Application Data

[63] Continuation-in-part of application No. 08/753,716, Nov. 27, 1996.

[51] Int. Cl.$^6$ ........................................... G06F 12/14
[52] U.S. Cl. ........................................... 713/200
[58] Field of Search ........................... 395/186; 364/222.5, 364/286.4, 286.5; 326/8; 380/4, 23, 24; 340/825.34

[56] References Cited

U.S. PATENT DOCUMENTS

| | | | |
|---|---|---|---|
| 4,405,829 | 9/1983 | Rivest et al. | 178/22.1 |
| 4,868,877 | 9/1989 | Fischer | 380/25 |
| 4,981,370 | 1/1991 | Dziewit et al. | 380/25 |
| 5,005,200 | 4/1991 | Fischer | 380/30 |
| 5,031,214 | 7/1991 | Dziewit et al. | 380/23 |
| 5,163,091 | 11/1992 | Graziano et al. | 380/25 |
| 5,191,613 | 3/1993 | Graziano et al. | 380/25 |
| 5,214,702 | 5/1993 | Fischer | 380/30 |
| 5,311,591 | 5/1994 | Fischer | 380/4 |
| 5,457,746 | 10/1995 | Dolphin | 380/4 |
| 5,499,294 | 3/1996 | Friedman | 380/10 |
| 5,572,590 | 11/1996 | Chess | 380/4 |
| 5,572,673 | 11/1996 | Shurts | 395/186 |
| 5,579,393 | 11/1996 | Conner et al. | 380/25 |
| 5,619,571 | 4/1997 | Sandstrom et al. | 380/4 |
| 5,675,650 | 10/1997 | Cordery et al. | 380/23 |
| 5,677,953 | 10/1997 | Dolphin | 380/4 |
| 5,703,951 | 12/1997 | Dolphin | 380/25 |

OTHER PUBLICATIONS

"Public–Key Digital Signature Algorithms", Applied Cryptography, 2nd Edition, ISBN 0–471–11709–9, Chapt. 20, pp. 483–502, 1996.

Schneier, "E–Mail Security", John Wiley & Sons, Inc, pp. 54–57, 67–74 and 225–226, Dec. 1995.

Garfinkel, "PGP: Pretty Good Privacy", O'Reilly & Associates, Inc., pp. 17–21 and 217–232, Dec. 1995.

Kent, "PGP Companion for Windows", Ventana Press, pp. 85–97, Dec. 1995.

*Primary Examiner*—Robert W. Beusoliel, Jr.
*Assistant Examiner*—Stephen C. Elmore
*Attorney, Agent, or Firm*—Beyer & Weaver, LLP

[57] ABSTRACT

Methods, apparatuses and products are provided for establishing and verifying the authenticity of data within one or more data files. In accordance with one aspect of the present invention, a method for verifying the authenticity of data involves providing at least one data file which includes an identifier and a signature file which includes the identifier for the data file as well as a digital signature. The digital signature is then verified using a computer system, and the identifier in the data file is compared with the identifier in the signature file using the computer system. In one embodiment, the identifier for the data file includes at least one certificate authority, site certificate, software publisher identifier, or a site name, and verifying the authenticity of data involves setting a security level for at least one of the certificate authority, the site certificate, the software publisher identifier, and the site name.

32 Claims, 7 Drawing Sheets

IMPLEMENTING DIGITAL SIGNATURES FOR DATA STREAMS AND DATA ARCHIVES

CROSS REFERENCE TO RELATED APPLICATION

The present invention is a continuation-in-part of U.S. patent application Ser. No. 08/753,716, entitled "Digital Signatures for Data Streams and Data Archives," filed Nov. 27, 1996, which is incorporated herein by reference in its entirety.

FIELD OF THE INVENTION

The present invention relates generally to the sharing of data among computing resources. More specifically, the present invention relates to methods, apparatuses and products for securing and verifying the authenticity of data being processed on a computer system.

BACKGROUND OF THE INVENTION

With the increasing popularity of networked computing environments, such as the Internet, there has been a corresponding increase in the demand to provide for the transferring of shared information among the networked computers in a secure manner. For example, when a user of the Internet sends information in the form of data to another user it may be useful for the receiving user to verify that the data received has not been corrupted or otherwise altered in some manner. Furthermore, the receiving user may also find it useful to verify that the data received was actually sent by the proper sending user rather than an impostor.

As a result, methods and algorithms that increase the security of data transmitted over computer networks and other data links have been developed and deployed with some success. The more secure methods tend to include encrypting all or part of the data prior to sending it, and likewise decrypting the received data prior to using it. Such encryption and decryption techniques may, for example, include adding encryption data to the data file, and encoding or otherwise transforming the data in the data file with a computer system by running a "signature algorithm".

There are currently several signature algorithms in use today. One popular signature algorithm is actually a combination of a Message Digest algorithm and an RSA encryption algorithm (e.g., MD5 with RSA, or MD2 with RSA, or the like). The Message Digest with RSA signature algorithm is a patented algorithm (U.S. Pat. No. 4,405,829 issued Sep. 20, 1983) that is available from RSA Data Security, Inc. of Redwood City, Calif. Another popular signature algorithm is the DSA encryption algorithm. The DSA encryption algorithm, which is available from the United States Government, may be used for limited purposes by private parties as a signature algorithm. These signature algorithms will be discussed in limited detail below. For a more detailed description of these and other signature algorithms and related encryption operations, refer to *Applied Cryptography*, Second Edition, 1996, by Bruce Schneier which is available from John Wiley & Sons, Inc. New York City, N.Y., and which is herein incorporated, in its entirety, by reference.

The Message Digest with RSA algorithm includes the capability to generate a "digital signature" that can be added to data files. Digital signatures are basically mechanisms through which users may authenticate the source of a received data file. A digital signature is typically a special sequence of data that can be generated and provided along with a related data file to other users. The basic concept behind most signature algorithms is that every user ( e.g., individuals, companies, governments, etc.) will have a "key pair" that includes both a "private key" and a "public key". A key may, for example, be a numerical sequence. The private key is a unique key that is assigned to a single user and intended to be kept secret by that user. The private key may be used by the assigned user to create a digital signature for a data file with a signature algorithm. The public key, on the other hand, is typically made available to all other users. The public key may be used by these other users to verify that the digital signature on a received data file is authentic (i.e., that the digital signature was created with the private key). The verification process is accomplished with the same signature algorithm. In principle, such a verification process may provide a relatively high level of confidence in the authenticity of the source of the received data.

In addition to digital signature generating algorithms, there are also algorithms that may be used to authenticate that the data file has not been corrupted in some manner. These algorithms are typically known as "one-way hash functions". One example of such an algorithm is the Message Digest, introduced above. A one-way hash function usually does not require a key. One-way hash functions typically include additional data that is inserted into the data file. As such, when the data file is received the hash function may be used to verify that none of the data within the data file has been altered since the generation of the hash function. However, hash functions are typically limited in that the user may not necessarily infer anything about the associated file, such as who sent it. It is noted that many signature algorithms use one-way hash functions as internal building blocks.

For relatively open, unsecured networks such as the Internet, it may be useful for users to authenticate received data files prior to using them as intended. Such data files may include, but are not limited to, computer programs, graphics, text, photographs, audio, video, or other information that is suitable for use within a computer system. No matter the type of data file, authentication may be accomplished with a signature algorithm or similar type of encryption algorithm as described above. By way of example, if the data file is a software program the user may wish to authenticate that it was sent by a trustworthy authority prior to exposing his or her computer system to the software program, lest the program include a "Trojan Horse" that infects the user's computer with a virus. In such a case, the sending user may authenticate the data as described above.

Another example is where the receiving user wishes to authenticate a text and/or image data file prior to displaying it on his or her computer screen. This may be useful to control the display of text and images having undesirable content. For example, parents may want to limit any access their children may have to pictures and text relating to adult subjects and materials. This can be accomplished by verifying that the data file (e.g., a text or image file), came from a trusted source. Similarly, providers of text and image files may want to provide a "stamp" of approval or authenticity so as to control the use of tradenames and other intellectual property.

Unfortunately, the process of encrypting and decrypting, signing and verifying, and/or generating hash functions places an additional burden on the sending and receiving user's computational resources. The burden is compounded for users who send and receive several data files. By way of example, the growth of that aspect of the Internet known as the World-Wide Web has lead to a tremendous increase in the transfer of multiple data files between users. These multiple data files often include the components or objects that constitute an object-oriented software process, such as a Java™ applet. To illustrate the potential burden that can be placed on the receiving user's computer resources in such a multiple data file transfer, one need only calculate the resulting processing time associated with verifying the digital signatures for each of the files. For example, if an Java™ applet included 200 digitally signed Java™ class files (including data files), assuming that the average verification process took about 1 second on a conventional desktop personal computer, then the user would have to wait for about 200 seconds after receiving the data files to use the applet. Such delays may significantly reduce the effectiveness of such a computer network environment. This is especially true for data files relating to a timed process, such as streaming audio or video data file in real (or near-real) time.

Therefore, what is desired are more efficient methods, apparatuses and products for securing and verifying the authenticity of data files, especially for data files intended to be transferred over computer networks.

SUMMARY OF THE INVENTION

The present invention provides more efficient methods, apparatuses and products for securing and verifying the authenticity of data files, such as data files intended to be transferred over computer networks. In accordance with one aspect of the present invention, a method for verifying the authenticity of data involves providing at least one data file which includes an identifier and a signature file which includes the identifier for the data file as well as a digital signature. The digital signature is then verified using a computer system, and the identifier in the data file is compared with the identifier in the signature file using the computer system.

In one embodiment, the identifier for the data file includes at least one certificate authority, site certificate, software publisher identifier, or a site name, and verifying the authenticity of data involves setting a security level for at least one of the certificate authority, said site certificate, said software publisher identifier, and said site name. In such an embodiment, the data file is downloaded to the computer system, and if the data file is an applet and the digital signature is verified, then verifying the authenticity of data also involves branding and running the applet accordingly.

In another embodiment, a data communication connection is established between the computer system and a remote site, and a determination is made regarding whether the site requires a secure connection, and when a secure connection is required, a determination is made regarding whether a site certificate for the site is valid. In such an embodiment, a determination can be made as to whether the site certificate is trusted if it is determined that the site certificate is valid.

In another aspect of the present invention, an apparatus for verifying the authenticity of at least one data file, which includes an identifier, and a signature file which includes the identifier for the data file in addition to a digital signature, includes a verifier for verifying the digital signature and a comparator for comparing the identifier in the data file with the identifier in the signature file. In one embodiment, the digital signature is verified with a signature algorithm. In another embodiment, the comparator includes a one-way hash function algorithm.

In still another aspect of the present invention, a computer program product including a computer-usable medium having computer-readable program code embodied thereon for use in verifying the authenticity of data provides at least one data file and a signature file, where the data file includes an identifier and the signature file includes the identifier for the data file and a digital signature. Program code for verifying the digital signature using the computer system and comparing the identifier in the data file with the identifier in the signature file is also included in the computer program product.

In one embodiment, the computer program product includes computer-readable program code for downloading the data file to the computer system and verifying the digital signature when the data file is an applet, and appropriately branding the applet. In another embodiment, computer-readable program code includes code for running the applet and code for determining whether the applet performs an action that triggers a security check. In another embodiment, code is included for use in establishing a secure connection with a remote site.

In yet another aspect of the present invention, a computer system arranged to verify the authenticity of a data file, which includes an identifier and is associated with a signature file that has the identifier for the data file and a digital signature, includes a processor, a memory coupled to the processor, and a verifier arranged to verify the digital signature and compare the identifier in the data file with the identifier in the signature file. In one embodiment, the identifier for the data file includes at least one of a certificate authority, a site certificate, a software publisher identifier, and a site name. In such an embodiment, the verifier is further arranged to set a security level for at least one of the certificate authority, the site certificate, the software publisher identifier, and the site name. In another embodiment, the data file is an applet and the verifier is arranged both to brand the applet and to run the applet.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Several embodiments of the present invention provide novel methods, apparatuses and products that reduce the computational demands placed on both source user computer systems and receiving user computer systems by requiring the implementation and the verification of only a single digital signature for an arbitrary number of data files. In accordance with an embodiment of the present invention the data files need not be individually signed. Instead, a separate signature file is created such that when the separate signature file is digitally signed and later verified, the data files to which it corresponds can be authenticated without running the signature algorithm for each of these data files. In one embodiment, the signature file includes a list of "identifiers", such as one-way hash functions, that are associated with each of the data files to be transferred. As such, the signature file is essentially the cryptographic equivalent of a digital signature for each of the data files.

Thus, with an embodiment of the present invention a user can create a signature file that includes unique identifiers for each data file. The signature file can be digitally signed by using a signature algorithm. The signed signature file and data files can then be sent to a receiving user, who can then verify the digital signature using the appropriate signature algorithm. Once the digital signature has been verified, the identifiers within the signature file can be compared to the identifiers within the data files. If the identifier within a given data file matches the corresponding identifier in the signature file, then the data file can be verified as being authentic. The receiving user can then proceed to process the verified data files with confidence in their authenticity. As a result, computational delays can be reduced because there is no longer the need to digitally sign and later verify the digital signature for each of the data files.

Figure 1:
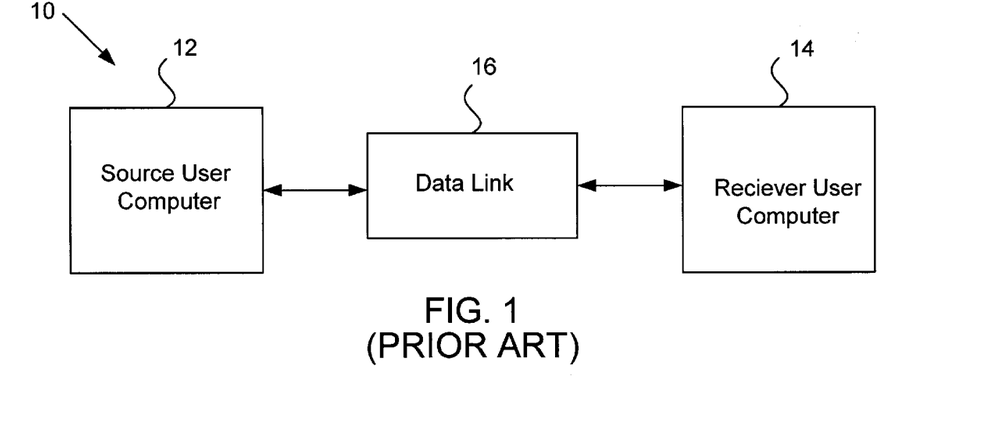
FIG. 1 illustrates a networked computing environment.

FIG. 1 illustrates a networked computing environment 10, as represented by a block diagram of a source user computer system 12 coupled to exchange information in the form of data with a receiver user computer system 14 over a data link 16. Source user computer system 12 can, for example, take the form of a server computer such as a web server associated with the Internet. Likewise, receiving user computer system 14 can, for example, take the form of a client system that is networked via data link 16 to a web server. In such a case, data link 16 can therefore represent a portion of, or the entire, Internet and other connected networks. Data link 16 can also represent one or more local area networks (LANs), wide area networks (WANs), "intranets" or "extranets", or other like telecommunication or data networks.

Figure 2:
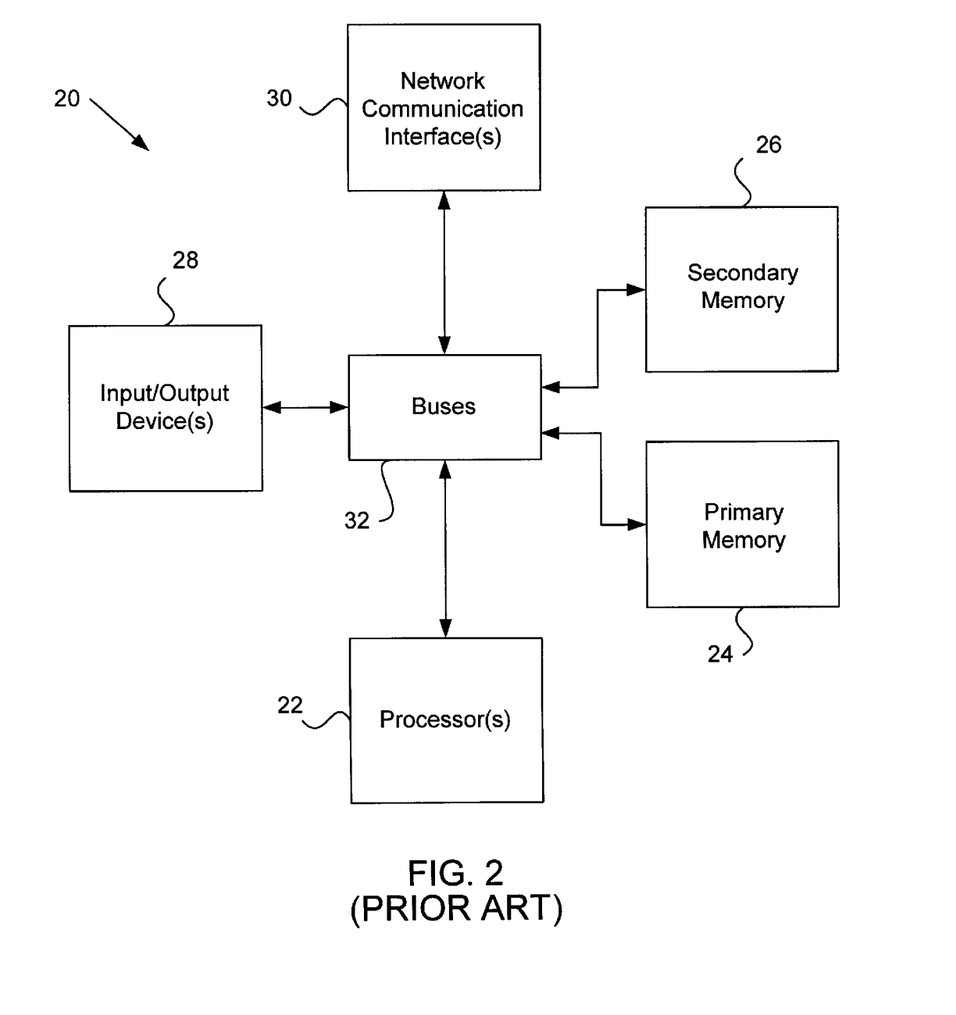
FIG. 2 illustrates a typical computer system for use with the networked computing environment in FIG. 1.

FIG. 2 illustrates a typical computer system 20 that can be used by either a sending user or a receiving user, in accordance with FIG. 1. Alternatively, computer system 20 can be a stand-alone computer capable of receiving data through computer useable products. Computer system 20 includes one or more processors 22, a primary memory 24, a secondary memory 26, one or more input/output (I/O) devices 28, one or more network communication devices 30, and one or more buses 32.

Processors 22 provide the capability to execute computer instructions. Processors 22 can, for example, be microprocessors, central processing units (CPUs), or microcontrollers such as found in many of the desktop, laptop, workstation, and mainframe computers available on the market. Processors 22 can also take the form of conventional or even customized or semi-customized processors such as those typically used in special purpose or larger frame computers, telecommunication switching nodes, or other networked computing devices. Processors 22 are coupled to output data to buses 32 and to input data from buses 32.

Buses 32 are capable of transmitting or otherwise moving data between two or more nodes. Buses 32 can, for example, take the form of a shared general purpose bus or can be dedicated to transmitting specific types of data between specific nodes. Buses 32 can include interface circuitry and software for use in establishing a path between nodes over which data can be transmitted. It is recognized that some devices, such as processors 22 can also include one or more buses 32 internally for transmitting data between internal nodes therein. Data can include processed data, addresses, and control signals.

Primary memory 24 typically provides for the storage and retrieval of data. Primary memory 24 can, for example, be a random access memory (RAM) or like circuit. Primary memory 24 can be accessed by other devices or circuits, such as processors 22, via buses 32.

Secondary memory 26 typically provides for additional storage and retrieval of data. Secondary memory 26 can, for example, take the form of a magnetic disk drive, a magnetic tape drive, an optically readable device such as a CD ROMs, a semiconductor memory such as PCMCIA card, or like device. Secondary memory 26 can be accessed by other devices or circuits, such as processors 22, via buses 32. Secondary memory 26 can, for example, access or read data from a computer program product including a computer-usable medium having computer-readable program code embodied thereon.

I/O devices 28 typically provide an interface to a user through which data can be shared. I/O devices 28 can, for example, take the form of a keyboard, a tablet and stylus, a voice or handwriting recognizer, or some other well-known input device such as, of course, another computer. I/O devices 28 can also, for example, take the form of a display monitor, flat panel display, or a printer. I/O devices 28 can be accessed by other devices or circuits, such as processors 22, via buses 32.

Network communication devices 30 typically provide an interface to other computing resources and devices, such as other computer systems. Network communication devices 30 typically include interface hardware and software for implementing data communication standards and protocols over data communication links and networks. For example, with a network connection, processors 22 can send and receive data (i.e., information) over a network. The above-described devices and processes will be familiar to those of skill in the computer hardware and software arts.

Figure 3A:
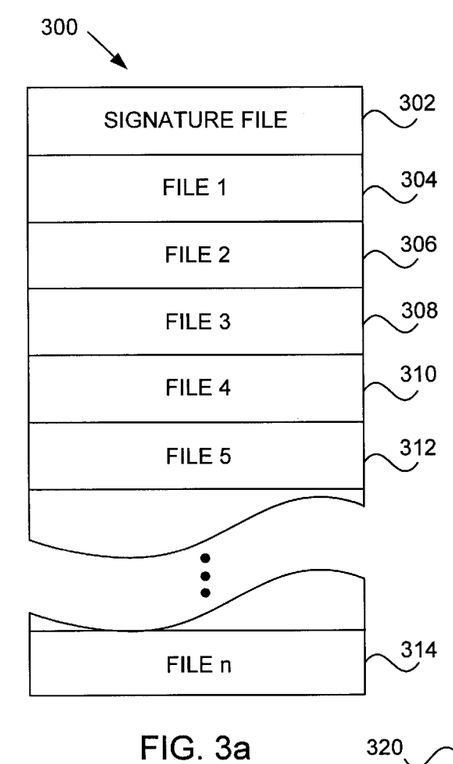
FIG. 3a illustrates an embodiment of an archival data structure, including a signature file, for use with an embodiment of the present invention.

FIG. 3a illustrates an embodiment of an archival data structure 300 in accordance with an embodiment of the present invention. Data structure 300 includes a signature file 302 and several data files 304–314. Files 304–314 can be any digital bit stream, such as, for example, Java™ class files, image files, audio files, text files, and even additional signature files.

Figure 3B:
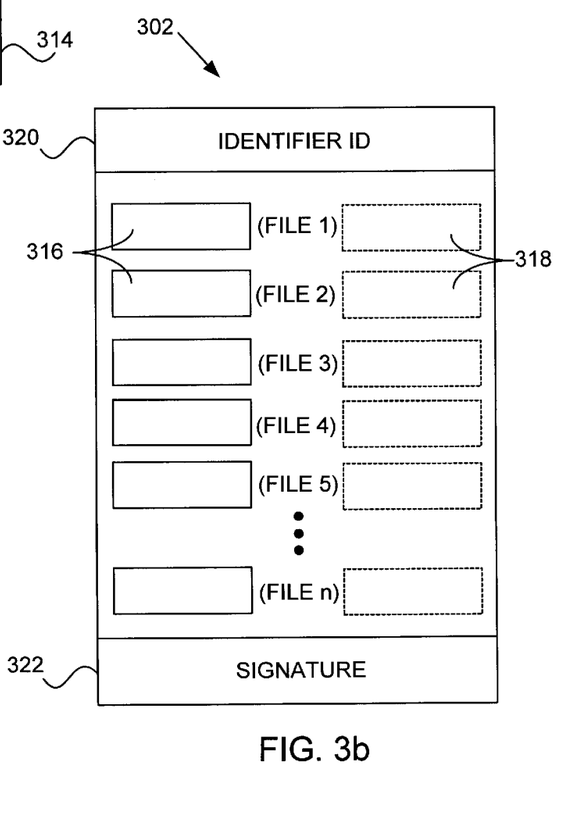
FIG. 3b illustrates an embodiment of a signature file, for use with an embodiment of the present invention.

FIG. 3b illustrates an embodiment of a signature file 302. It should be appreciated that in some embodiments, signature file 302 is a header file. In the illustrated embodiment, signature file 302 includes at least one identifier 316 for each of the data files 304–314. Optionally, signature file 302 can also contain additional data 318 for each of the data files 304–314. For example, additional data 318 can further comprise the information about the name of the file, the author of the file, the date of the file, the version of the file, the file's rating (e.g., movie rating, such as "PG"), or any other authenticated data that the users may want to include within signature file 302.

Signature file 302 further includes an identifier ID 320 and a digital signature 322. Identifier ID 320 provides the information necessary to determine the algorithm(s) used to create the identifiers listed in signature file 302. Digital signature 322 represents the digital signature created for the signature file. The structure of digital signature 322 will depend, of course, on the signature algorithm used to create it.

Figure 4:
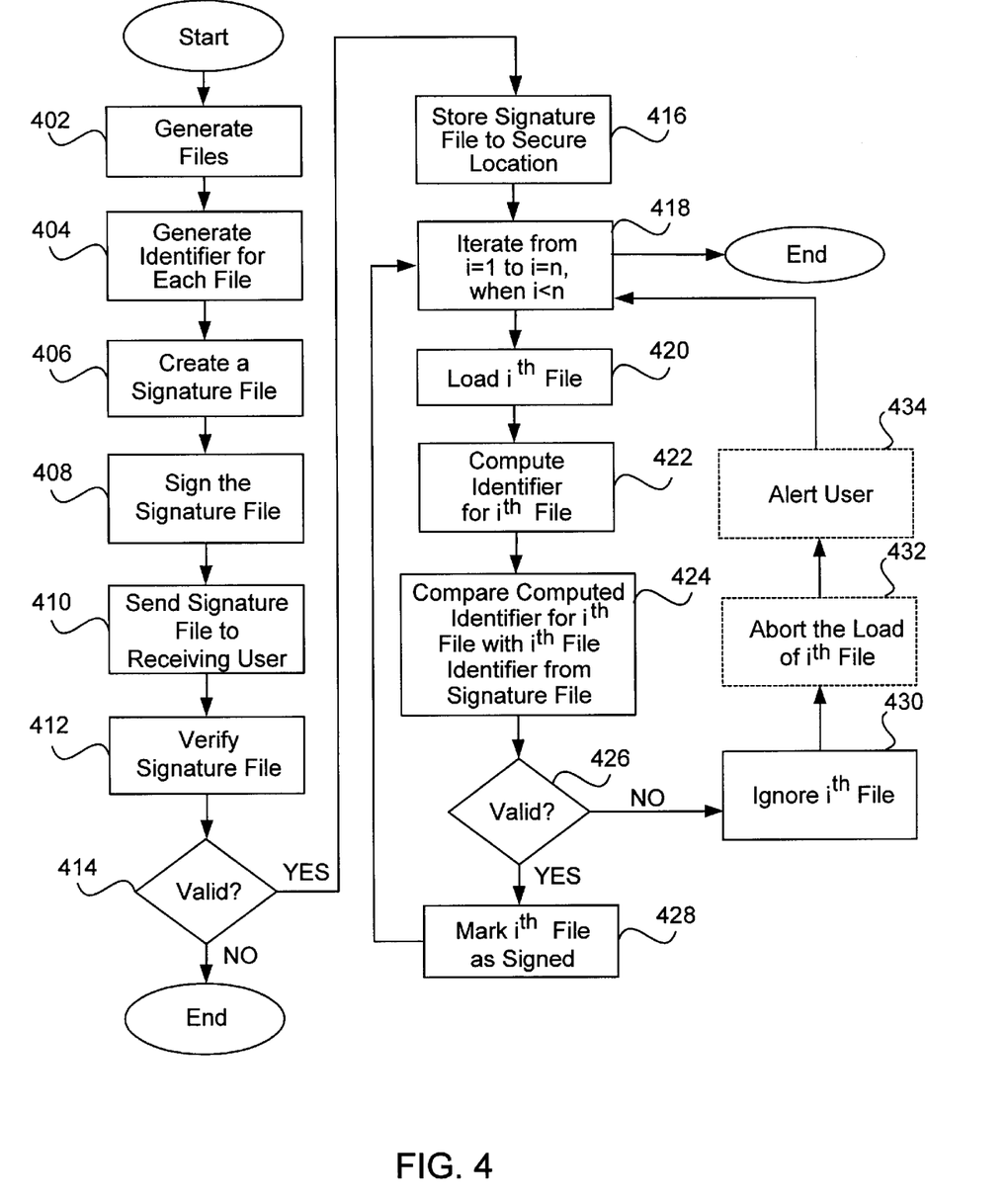
FIG. 4 is a flow chart of an embodiment of the present invention for use with data structures having signature files.

FIG. 4 illustrates a method 400, in accordance with an embodiment of the present invention, that includes step 402 for generating one or more data files. Step 402 can, for example, include using a text program to generate a text file, a recording program to generate an audio or video file, a graphics program to generate an image or movie file, a programming language to generate a class file or program file, or any other mechanism that is capable of generating a data file.

Having generated one or more data files in step 402, step 404 includes generating an identifier for each of these data files. The identifiers generated in step 404 can, for example, be generated by a one-way hash function algorithm, or alternatively can even take the form of a cyclic redundancy checksum (CRC), or the like. It is recognized, however, that generally a one-way hash function algorithm tends to provide for greater security because such functions cannot be easily or efficiently broken, or otherwise reverse-engineered. By way of example, one-way hash function algorithms, such as MD5 and SHA are typically considered to be cryptographically secure. Such algorithms will be known to those having skill in the computer science art.

Next, step 406 includes creating a signature file that lists, or otherwise compiles, the identifiers as generated in step 404. A signature file can, for example, be a text file that lists the identifiers. Optionally, a signature file can further include, for example, the name of each file, the author of each file, the file version, a date-stamp for the file, or other data relating to each data file. Step 406 can further include one or more programs that inquire, trace, select, or otherwise gather or render such data from the data files. Step 406 can be performed, for example, by processing the data files in a batch mode process to gather the appropriate identifiers and any additional data. Those skilled in the art will recognize that there can be benefits (e.g., in efficiency) to specifically ordering, grouping or otherwise arranging the data listed in the signature file in some manner that expedites the steps in method 400. For example, it can be useful to group the file name or the author along with the identifier.

Once the signature file has been created, step 408 includes digitally signing the signature file with a signature algorithm. Examples of suitable signature algorithms include a combined Message Digest algorithm and RSA encryption algorithm (e.g., MD5 with RSA, or MD2 with RSA, or the like), or the DSA algorithm (discussed above). Step 408 can also include, for example, generating a digital signature for the signature file with a signature algorithm by way of a public or private key (e.g., see Schneier, above).

The signed signature file from step 408 is then sent, provided or otherwise made available to the receiving user in step 410. Step 410 can, for example, include transmitting the signed signature file over a data bus, data link, the Internet, or some other computer or data communication network or link. In addition it is recognized that step 410 can, for example, include storing the signature file in a computer readable medium like a magnetic storage media or optical storage media, and moving the signed signature file on the computer readable medium from one computer to another computer.

Upon receipt or access, the receiving user in step 412, verifies the authenticity of the signed signature file sent or made available in step 410. Step 412 can, for example, include verifying the digital signature on the signed signature file with a signature algorithm by way of a key.

Step 414 represents a decision wherein the validity of the digital signature as determined in step 412 either terminates or continues method 400. While depicted as interrupting or otherwise preempting method 400, it is recognized that step 414 can also include invoking another process, such as an alarm or notification process, or log process, that in some way records or identifies, or otherwise addresses that that verification of the signed signature file in step 412 failed.

If the decision in step 414 is that the file is valid (i.e., authentic), then the process continues to step 416 which includes storing at least the identifiers from the signature file. In one embodiment of the present invention, the identifiers are stored in a secure location. A secure location can, for example, be the RAM of the receiving computer system since this memory is readily cleared when the process is completed. Alternatively, the identifiers can be stored to a disk or tape drive wherein they can be retrieved at some later stage. Those skilled in the art will recognize that various data storage devices and other computer system configurations pose varying and potential security risks (i.e., some storage devices will be more secure than others). It is also recognized that additional security measures, such as encryption and file access privileges, can be used to further secure or increase the trustworthiness of the signature file as stored in step 414.

Once the identifiers have been stored in a secure location in step 416, then the data file or data files whose identifiers were listed in the signature file in step 406 can then be processed in accord with a loop as represented in step 418. Step 418 can, for example, include a counter mechanism that iteratively controls the number of times that step 420 will be entered into based on the number of identifiers listed in the signature file. For example, if there are "n" number identifiers listed in the signature file (i.e., there are n data files to be loaded), then an iterative loop can count up from i=1 to i=n, or alternatively down from i=n to i=1, or otherwise determines when all of the data files have been loaded, or that loading has been attempted, in accord with the remainder of the steps in method 400 as presented below.

Step 420 includes loading the $i^{th}$ data file. Step 420 can, for example, include any of the methods in step 410 to either download, upload, broadcast, or otherwise move the $i^{th}$ data file from one location to another location. Once the $i^{th}$ data file has been loaded, step 422 includes providing, computing or generating the identifier for the $i^{th}$ data file with the appropriate identifier algorithm (for that data file).

Next, step 424 includes comparing the identifier provided in step 422 with the identifier listed, for the $i^{th}$ data file, in the signature file which was stored in step 416. If the identifiers match then the $i^{th}$ data file is verified as authentic. If the identifiers do not match then the $i^{th}$ data file is considered not to have been verified.

Step 426 represents a decision wherein the validity of the identifier, as determined in step 424, either interrupts or continues the iterative loop of step 418. If the identifier for the $i^{th}$ data file has been verified in step 424, then step 426 continues the iterative loop of step 418 by proceeding to step 428 which includes marking, or otherwise recording or establishing in some manner, that the $i^{th}$ data file has been verified as being authentic. Step 428 can, for example, include modifying or marking the $i^{th}$ data file as having been signed by the source user.

If, on the other hand, the identifier for the $i^{th}$ data file is not verified as authentic in step 424, then step 426 interrupts the iterative loop of step 418 by proceeding to step 430. Step 430 includes interrupting the iterative loop of step 418 in some manner so as to avoid step 428 and to proceed back to step 418. Step 430 can, for example, include ignoring the $i^{th}$ data file. In addition to step 430, other steps can be included in method 400 to somehow record or otherwise identify that the $i^{th}$ data file is not authentic.

Thus, with the data structure and steps above, a user who is sending several data files will likely reduce the associated processing time because rather than having to generate a separate digital signature for each data file, the sending user need only create a signature file and digitally sign that file. Likewise, with the data structure and steps above, the user who is receiving several data files will likely reduce the associated processing time because rather having to verify each data file as being authentic by decrypting an associated digital signature, the receiving user need only verify that the signature file is authentic. Such a hybrid verification process substantially streamlines the signature and verification processes. As a result, data files may be digitally signed, and later authenticated and processed in less time.

Additionally, step 430 can lead to optional step 432 which aborts the attempted load, and/or to optional step 434 which alerts or otherwise warns of the failure to verify authentication in step 424. Once steps 430, and optionally 432 and/or 434, have been completed then method 400 returns to step 418 to complete the iterative loop therein. Once the iterative loop of step 418 has been completed, then method 400 is ended.

In one embodiment of the present invention, for each signatory authority, a certificate is created, i.e., the unique identifiers which are listed in a signature file are embodied as certificates. In general, the certificates are tokens that a site, which is typically either a source user computer system or a receiving user computer system, can use to identify itself. Several sites can be associated with a single certificate. Alternatively, several certificates can be associated with one site.

A source user computer system and a receiving user computer system can be configured to exchange not only data files but computer software in the form of "applets," such as those written in the Java™ programming language available from Sun Microsystems of Mountain View, Calif. "Applets" as used herein are software programs that are configured to be passed from a source computer, typically a server, to a client machine and run in conjunction with software, as for example browser software, already installed on the client. In the described embodiment, applets are instantiated from class files, which are grouped together into an archival data structure as described above with respect to FIG. 3a, that are downloaded from a source computer, or a server, to a client machine. Typically, applets provide additional functionalities to browser software by performing various computational tasks which the browser software itself is not configured to perform. Thus, users who download applets can provide the browser software with additional functionalities that are not otherwise available to the browser software. Such additional capabilities can include, e.g., custom interfaces to a database.

A security manager associated with a browser can be used on either a source computer or a client machine to control operations which are accessible to given applets, as for example a Java™ applet. In other words, a security manager can be used to control the actions which an applet is allowed to perform, or otherwise extend privileges to applets. Although the actions which an applet is allowed to perform can be widely varied, in general, the actions are read and write actions. Within a security manager, different security levels can be implemented to provide a user with the flexibility to set permissions for different certificates and sites associated with an applet. Generally, a user can select a particular certificate or site, or a group of certificates and sites, and set the security level for his selection.

Using a security manager to implement security levels generally entails identifying which applet actions are considered to be secure, safe, or trusted, as well as applet actions which are considered to be unsecure, unsafe, or not trusted. A secure action is generally an action which is not considered to have serious potential for jeopardizing system security or for corrupting information stored on a client or a server. By way of example, a secure action can be a read-only action, or a read-only action for a particular directory. On the other hand, an unsecure action is generally any action which has potential for violating system security or for damaging information stored on a client or a server. Unsecure actions can include, but are not limited to, writing actions, deleting actions, renaming actions, and even reading actions which request access to sensitive documents. Unsecure actions can further include requests to establish connections to remote sites which are protected.

In one embodiment of the present invention, a browser which can run Java™ applets, as for example a HotJava™ browser (available from Sun Microsystems of Mountain View, Calif.), has a security manager with security levels which include a high security level, a medium security level, a low security level, and an untrusted level. A high security level essentially enables applets to run with a set of safe actions, or constraints, while blocking any unsafe actions. In the described embodiment, the high security level enables applets to perform most actions which are considered to be safe, e.g., trusted, while denying access for any actions which are considered to be unsafe, e.g., not trusted.

A medium security level can be used to enable applets to run with safe constraints, while providing users with the ability to grant permissions for actions which can potentially be unsafe. With a medium security level, a user can be warned through a user interface of an action which may not be a safe, e.g., allowable, action. In the described embodiment, a dialog box which describes the activity appears, and the user is prompted to either grant or deny permission for the potentially unsafe action to be executed. A low security level allows applets to run with minimal constraints, and in the described embodiment, does not warn the user of potentially unsafe actions. An untrusted security level is used to identify certificates and sites which are known to be unsafe.

Figure 5:
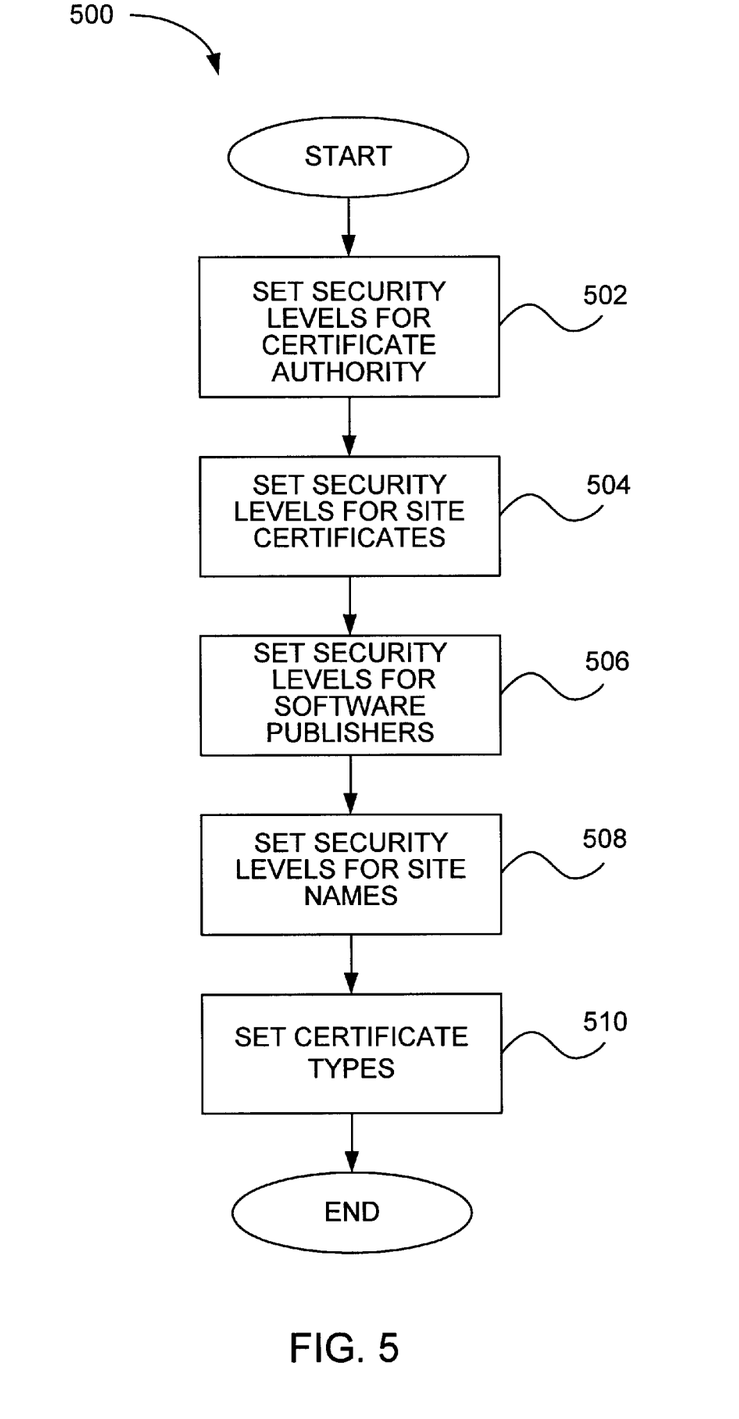
FIG. 5 is a flow chart which illustrates the steps associated with setting security levels in a security manager in accordance with an embodiment of the present invention.

Referring next to FIG. 5, the steps associated with setting security levels in a security manager will be described in accordance with one embodiment of the present invention. In one embodiment, the security levels, also known as levels of trust and verification settings, are the high security level, the medium security level, the low security level, and the untrusted security level, as previously described. Although the security levels can be set by a user through the use of a suitable graphical user interface (GUI), it should be appreciated that any suitable method can be used to set security levels.

The process of setting security levels in a security manager 500 begins, and in step 502, security levels for the certificate authority are set. The certificate authority enables different security levels, or priorities, to be applied to both individual certificates and groups of certificates. In general, the certificate authority can include, but is not limited to, information which identifies how a particular certificate is to be used. By way of example, a certificate authority can be set to enable one certificate to "vouch" for, or authenticate, other certificates.

After the security levels for the certificate authority are set, then the security levels for site certificates are set in step 504. Site certificates are certificates which a given site can use to initiate a secure connection over which a transaction can be made. Security levels for site certificates generally involve specifying secure socket layer (SSL) standard protocols and security permissions which can be used to authenticate connections over which secure transactions are to occur. Such secure communications technologies can be used to identify rogue, or potentially unsecure, sites and, hence, provide more secure channels over which transmissions can be made by avoiding communication with such sites.

In step 506, security levels for software publishers are set. It should be appreciated that in intranet environments, software is typically not published with certificates, as an intranet environment is usually considered to be a secure environment. Hence, software published within such a secure environment is generally assumed to be secure. However, for environments in which software is published with certificates, as for example in internet environments, the certificates can be used to determine if software code associated with the certificates is trusted for browser execution.

Security levels for site names are set in step 508. The process of setting security levels for site names is essentially the same as the process for setting software publishers, except that when a security level is set for a site, the security level is applied to all software associated with the site. Setting site name permissions generally enables software without certificates to be tested with little risk of tampering with system resources. Then, certificate types are set in step 510. Setting certificate types can entail determining how certificates are to be used, and choosing authorities for the certificates based upon how the certificates are expected to be used. After the certificate sites are set in step 510, the process of setting security levels is completed. It should be appreciated that the order in which the security levels are set can be widely varied depending upon the requirements of a particular security manager.

In some embodiments, additional "advanced" settings can be used to set security levels. In one embodiment, advanced settings are granularity controls which a user can modify through a GUI or similar interface enables the user to set specific, customized security levels for individual certificate authorities, site certificates, software publishers, or site names. Further, advanced settings can also be configured to enable a user to customize a security level for a group of certificate authorities, site certificates, software publishers, or site names. Advanced settings thus generally provide for flexibility in controlling security levels and in overall certificate handling. By way of example, through the use of advanced settings, a user can set a particular site certificate to a medium security level, while also specifying that the security permissions associated with the site certificate be limited to only allowing read access. In addition, advanced settings can also be used to override specifications at given security levels, e.g., advanced settings can be used to grant permissions which are not normally allowed at a given security level.

In the described embodiment, advanced settings are provided such that in addition to the high security level, the medium security level, the low security level, and the untrusted security level which were previously discussed, additional options are available to enable a user to select specific permissions for a site certificate, for example, which can be implemented in addition to selected security levels. These specific permissions can include, but are not limited to, allowing an applet to open windows without providing a warning message to a user, allowing an applet to automatically launch local applications with or without a warning dialog, allowing an applet to access all properties without providing a warning dialog, and allowing an applet to begin execution without providing a warning dialog.

Figure 5A:
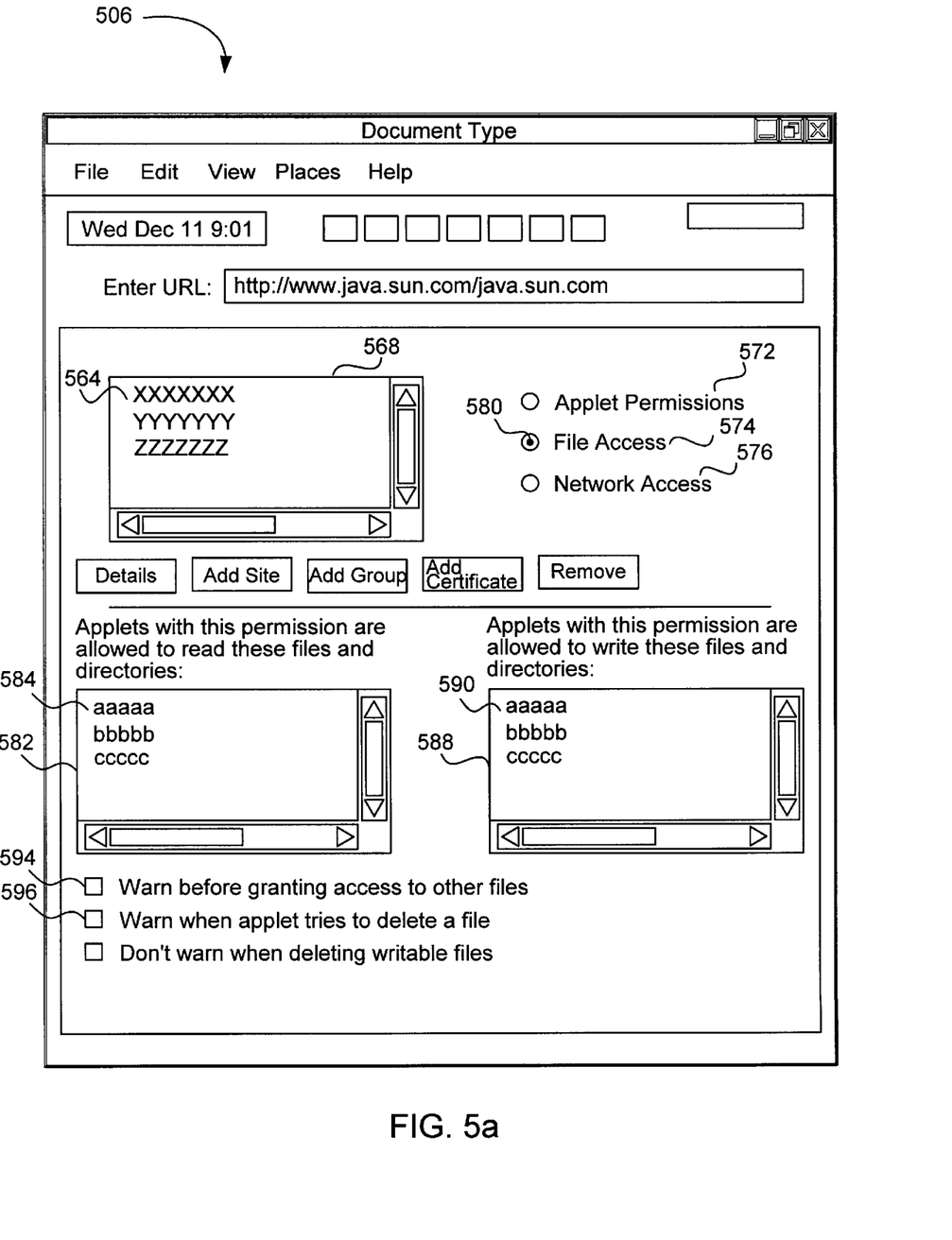
FIG. 5a is a diagrammatic representation of a browser interface which illustrates advanced settings in accordance with an embodiment of the present invention.

FIG. 5a is a diagrammatic representation of a browser interface which illustrates advanced settings in accordance with an embodiment of the present invention. As previously mentioned, advanced settings are used to select specific permissions which can be enabled or disabled in addition to the security levels provided with the browser interface. Although browser interface 560 can be any suitable browser interface 560, in the described embodiment, browser interface 560 is a basic representation of a HotJava™ browser. As shown, browser interface 560 includes an advanced settings display window 564. A first region 568 of display window 564 lists sites and certificates 570, as well as groups of sites and certificates, for which security permissions can be customized. "Applet Permissions" 572, "File Access" 574, and "Network Access" 576 are among permissions which can be customized. In the described embodiment, a selection 580 indicates that permissions for File Access 574, i.e., files which an applet is allowed to access, are to be set.

A second sub-region 582 displays files and directories 584 which, when selected, an applet with the selected settings, i.e., settings determined using the Applet Permissions 572 command, is allowed to read from. Similarly, third sub-region 588 displays files and directories 590 to which an applet with suitable permissions is allowed to write. Additional selectable options, as for example a "Warn before granting access to other files" option 594 or a "Warn when applet tries to delete a file" option 596 can further enable a user to customize security options.

Figure 6:
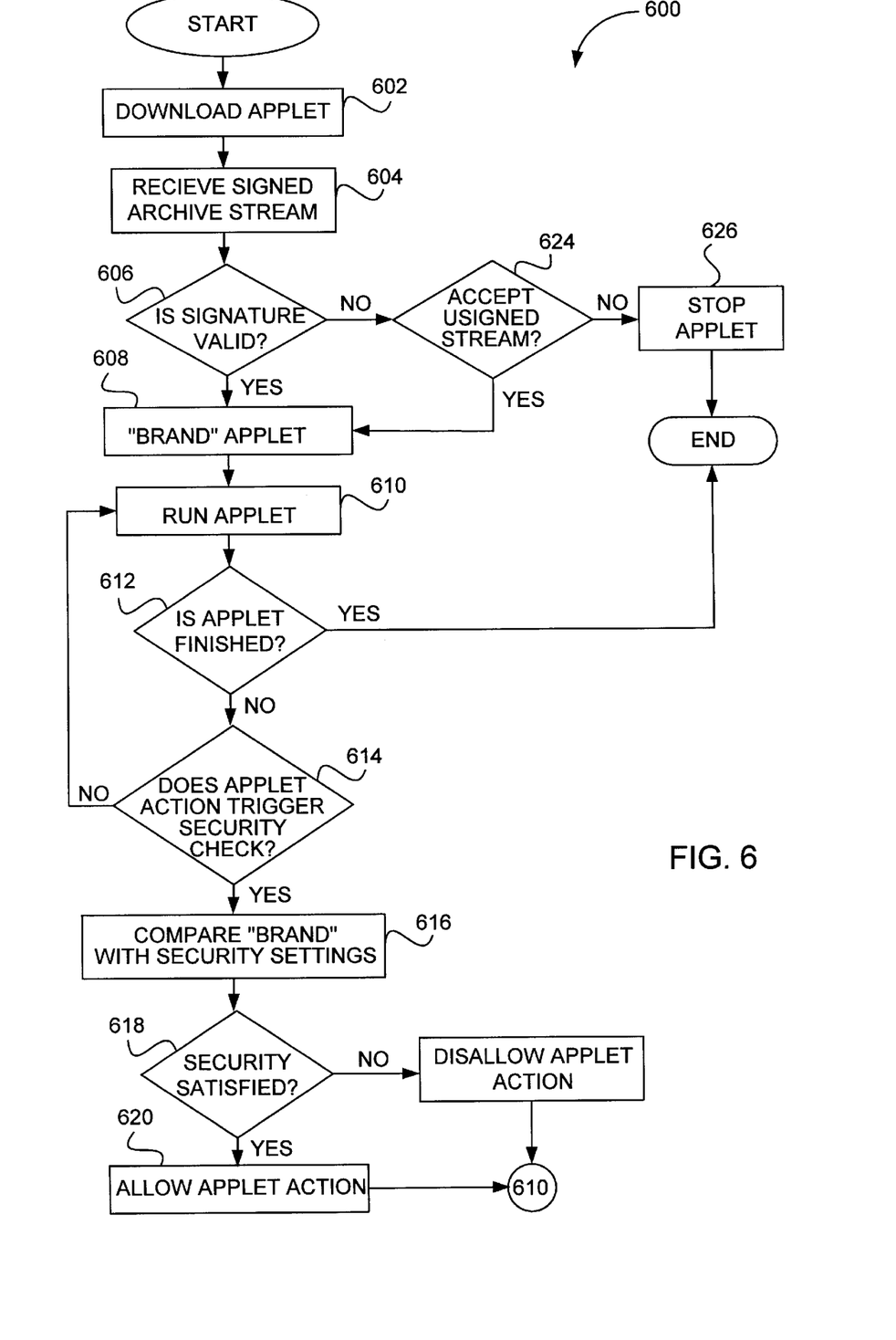
FIG. 6 is a flow chart which illustrates the steps associated executing an applet which uses verification settings in accordance with an embodiment of the present invention.

FIG. 6 is a flow chart which illustrates the steps associated with one process of executing an applet that uses verification settings in accordance with one embodiment of the present invention. The process of implementing verification settings begins, and in step 602, an applet is downloaded to a local machine on which the applet is to be executed. In the described embodiment, downloading the applet entails downloading at least part of the archive file, or archival data structure, that contains the class files from which the applet can be instantiated. After the applet is downloaded, a signed archive stream is received in step 604. In the described embodiment, the archive stream contains a digital signature that is associated with a Java™ archive file.

In step 606, a determination is made regarding whether the signature in the signed archive stream is valid, i.e., whether the signature is known and acceptable. It should be appreciated that the signed archive stream is one embodiment of the signed signature file which was previously described. The determination of whether the signature in the archive stream is valid can entail systematically checking a chain of authorities, e.g., certificates, in a signature file until a known authority is found. The known authority is then checked for validity. By way of example, a certificate "A" can be vouched for by a certificate "B," which is known to be a valid certificate. Hence, as certificate "B" is known to be valid, certificate "A" can then be assumed to be valid.

If the determination is that the signature is valid, then process flow proceeds to step 608 in which the applet is "branded." Branding, or marking, an applet generally refers to attaching a signer to the applet, or attaching an identifier to the applet which can be used to identify the validity of the applet. Once the applet is suitably branded, the applet is executed, or run, in step 610. While the applet is running, various actions within the applet are called.

A determination is made in step 612 regarding whether the applet has finished running. In other words, it is determined whether each action associated with the applet has either been executed or been disallowed from executing, as will be described below. If it is determined that applet execution has been completed, the process of executing an applet ends. If it is determined that the applet execution has not been completed, then in step 614, it is determined whether the applet action triggers a security check. That is, in step 614, a determination is made regarding whether a particular applet action falls within those actions determined to be potentially harmful to a user's system security. Such actions will be familiar to those of skill in the computer arts, and, more specifically, to those of skill in the computer security arts. By way of example, actions which are potentially harmful to the user's system security can include, but are not limited to, unrestricted write access, modification of system resources, and open transmission to other systems.

If the applet action triggers a security check, then the brand placed on the applet in step 608 is compared with security settings, or permission levels, which were previously provided by a user in step 616. In some embodiments, comparing security settings with the brand on the applet involves a consultation with a user through a user interface. In such embodiments, the user can authorize a bypass of security settings, i.e., the user can override the security settings to either allow or deny a particular action. From step 616, process control proceeds to step 618 which is the determination of whether security is satisfied for the applet action. If security is satisfied, either by virtue of the fact that the brand placed on the applet compares favorably with the security settings, or by virtue of the fact that the user has authorized the applet action, then the applet action is allowed in step 620. Process control then returns to step 610, and the continued execution of the applet. On the other hand, if security is not satisfied in step 618, then the applet action is disallowed in step 622. After the applet action is disallowed, process control returns to step 610 in which the applet continues to run.

If the applet action does not trigger a security check in step 614, then process flow returns to step 610 in which the applet continues to run. Process flow continues to loop between steps 610 and 614 until either the applet has finished executing, or a determination is made in step 614 that the current applet action triggers a security check, in which case process control proceeds to step 618 as previously described.

Returning to the check for signature validity in step 606, if a determination is made that the signature is not valid, then the archive is considered to be unsigned, and process flow proceeds to step 624 which is the determination of whether the unsigned stream should be accepted. In the described embodiment, the determination of whether the unsigned stream should be accepted is made by a user through the use of a user interface. By way of example, the user can be prompted with a warning dialog which indicates that while the signature was not valid, he can make the decision to run the applet. If the determination is made that the unsigned stream is to be accepted, process flow moves to step 608 in which the applet is branded as appropriate, e.g., branded to indicate that the stream associated with the applet is unsigned. If the determination in step 624 is that the unsigned stream is not to be accepted, then the applet is stopped, or prohibited, from running in step 626, and the process of executing an applet ends.

Figure 7:
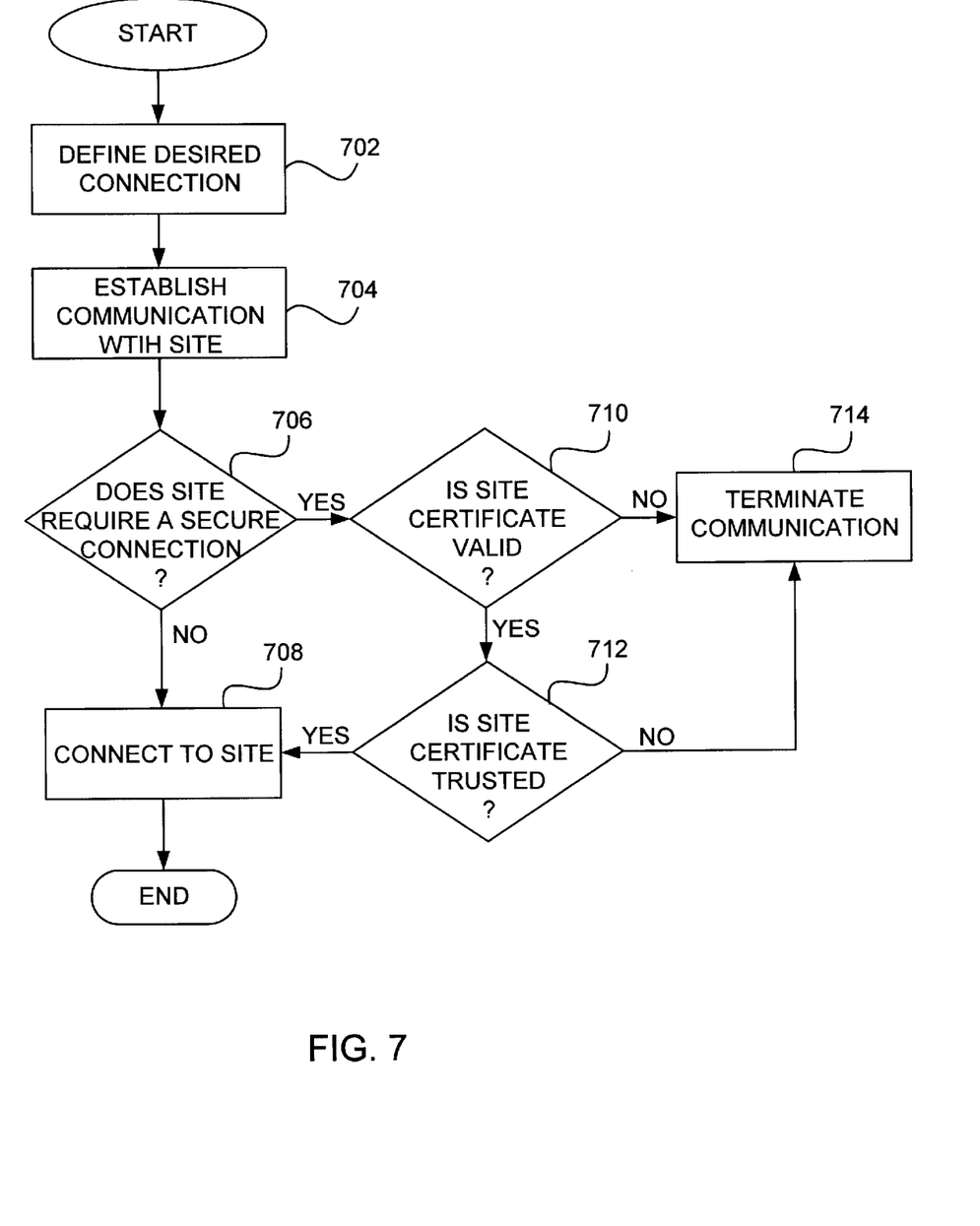
FIG. 7 is a flow chart which illustrates the steps associated with establishing a connection across a computer network in accordance with an embodiment of the present invention.

Referring next to FIG. 7, the steps associated with establishing a connection across a computer network will be described in accordance with one embodiment of the present invention. The process of making a connection 700 begins at step 702 in which the desired connection is defined. In the described embodiment, defining the desired connection entails specifying a universal reference language (URL) address for the site to which a connection is desired. After the connection is defined, communication is established with the site to which a connection is desired in step 704.

From step 704, process control proceeds to step 706 in which a determination is made regarding whether the site requires a secure connection. In one embodiment, a secure connection is a connection over a secure socket layer (SSL), as will be appreciated by those skilled in the art. If it is determined that a secure connection is not required, a connection to the site is made in step 708, and the process of establishing a connection is completed.

If it is determined that the site requires a secure connection, then in step 710, it is determined whether the site certificate associated with the site is valid. It should be appreciated that a valid site certificate is not necessarily a trusted site certificate, as a site certificate can be a valid certificate for a site that is not trusted, or is known to be unsafe. If the site certificate is valid, then process flow moves to step 712, which is the determination of whether the site certificate is trusted. If the determination is that the site certificate is trusted, then process flow proceeds to step 708 in which a connection is made to the site. Alternatively, if the determination is that the site certificate is not trusted, then in step 714, the communication which was established with the site (in step 704) is terminated. Similarly, if it is determined in step 710 that the site certificate is not valid, then communication with the site is terminated in step 714.

The embodiments of the present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as generating, calculating, computing, marking, ignoring, aborting, alerting, verifying, signing, sending, receiving, creating, iterating, identifying, running, or comparing. In any of the operations described herein that form part of an embodiment of the present invention, these operations are machine operations. Useful machines for performing the operations of an embodiment of the present invention include general purpose digital computers or other similar devices. In all cases, there should be borne in mind the distinction between the method of operations in operating a computer and the method of computation itself. An embodiment of the present invention relates to method steps for operating a computer in processing electrical or other physical signals to generate other desired physical signals.

An embodiment of the present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, an embodiment of the present invention further relates to computer readable media that include program instructions for performing various computer-implemented operations. The media and program instructions may be those specially designed and constructed for the purposes of an embodiment of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially arranged to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the identifiers or signature algorithms may be further selected, modified or otherwise limited in use so as to adhere to export regulations. This is especially true for computers networked to provide for the global exchange of data files.

In addition, steps involved with establishing a connection to a site, as well as steps involved with executing an applet which uses verification settings, may be reordered. Steps may also be removed or added without departing from the spirit or the scope of the present invention.

Further, although only a few security levels have been specified, it should be appreciated that the security levels can be widely varied in accordance with the requirements of a particular computer system. Therefore, the described embodiments should be taken as illustrative and not restrictive, and the invention should not be limited to the details given herein but should be defined by the following claims and their full scope of equivalents.

What is claimed is:

1. A computer-implemented method for verifying the authenticity of data, the method comprising:
   a) receiving at least one data file and a signature file, wherein the data file and the signature file are separate, the data file including a first identifier, the signature file including a representation of the first identifier for the data file and a digital signature, the signature file being arranged to include representations of identifiers for additional data files; and
   b) processing the signature file using a computer system to determine the authenticity of the signature file;
   c) comparing the first identifier in the data file with the representation of the first identifier in the signature file using the computer system to determine the authenticity of the data file, wherein processing the signature file further includes processing the digital signature using the computer system to determine the authenticity of the signature file; and
   d) marking the data file as signed when the first identifier in the data file and the representation of the first identifier in the signature file match.

2. The method as recited in claim 1 wherein when the first identifier in the data file and the representation of the first identifier in the signature file do not match, the method further includes at least one selected from the group of ignoring the data file, aborting the loading of the data file, and alerting a user.

3. A computer-implemented method for verifying the authenticity of data as recited in claim 1 further including:
   comparing a second identifier in a second data file with a representation of the second identifier in the signature file using the computer system.

4. A computer-implemented method for verifying the authenticity of data as recited in claim 1 wherein processing the digital signature further includes verifying the digital signature with a signature algorithm, the signature algorithm being a keyed algorithm.

5. A computer-implemented method for verifying the authenticity of data as recited in claim 4 wherein the signature algorithm is selected from a group consisting of a DSA algorithm, and a combined Message Digest and RSA algorithm.

6. A computer-implemented method for verifying the authenticity of data as recited in claim 1 wherein comparing the first identifier in the data file with the representation of the first identifier in the signature file further includes generating one or more of the identifiers with a one-way hash function algorithm.

7. A computer-implemented method for verifying the authenticity of data as recited in claim 1 wherein comparing the first identifier in the data file with the representation of the first identifier in the signature file further includes checking one or more of the identifiers with a cyclic redundancy checksum algorithm.

8. A computer-implemented method for verifying the authenticity of data as recited in claim 1 wherein the signature file includes additional data selected from the group consisting of a text, a name, an author, a version, a time-stamp, and a rating.

9. A computer-implemented method for verifying the authenticity of data as recited in claim 1 wherein the identifier is generated using one of a one-way hash function algorithm and a cyclic redundancy checksum algorithm.

10. A computer-implemented method for verifying the authenticity of data as recited in claim 1 wherein receiving the data file and the signature file further includes transferring the data file and the signature file among networked computers.

11. A computer-implemented method for verifying the authenticity of data as recited in claim 1 wherein the first identifier in the data file includes at least one of a certificate authority, a site certificate, a software publisher identifier, and a site name, the method further including setting a security level for at least one of said certificate authority, said site certificate, said software publisher identifier, and said site name.

12. A computer-implemented method for verifying the authenticity of data as recited in claim 11 including downloading the data file to the computer system, and when the data file comprises an applet and when the digital signature is verified, the method includes branding the applet as verified and running the applet.

13. A computer-implemented method for verifying the authenticity of data as recited in claim 12 wherein when the data file comprises an applet, and when the signature is not verified, the method includes determining whether an unsigned data file is acceptable for execution on the computer, and terminating the applet if an unsigned data file is not acceptable for execution on said computer.

14. A computer-implemented method for verifying the authenticity of data as recited in claim 13 including branding the applet when the unsigned data file is determined acceptable for execution on said computer.

15. A computer-implemented method for verifying the authenticity of data as recited in claim 14 including the running the applet and determining whether the applet performs an action that triggers a security check.

16. A computer-implemented method for verifying the authenticity of data as recited in claim 15 wherein the security check includes comparing the brand with the security level and allowing the action when the security check is satisfied and disallowing the action if the security check is not satisfied.

17. A computer-implemented method for verifying the authenticity of data as recited in claim 1, further including establishing a data communication connection with a remote site using the computer system, determining whether the site requires a secure connection, and determining whether a site certificate for the site is valid in response to a determination that a secure connection is required.

18. A computer-implemented method for verifying the authenticity of data as recited in claim 17, further including determining whether the site certificate is trusted in response to a determination that the site certificate is valid.

19. An apparatus for verifying the authenticity of at least one data file and a signature file, the data file including an identifier, the signature file including a representation of the identifier for the data file and a digital signature, the apparatus comprising:
    a processor for processing the digital signature to determine the authenticity of the signature file; and
    a comparator for comparing the identifier in the data file with the representation of the identifier in the signature file using the computer system to determine the authenticity of the data file, wherein the processor is further arranged to process the digital signature using the computer system to determine the authenticity of the signature file, the comparator further including a marker for marking the data file as signed when the identifier in the data file and the representation of the identifier in the signature file match.

20. An apparatus for verifying the authenticity of data as recited in claim 19 wherein the comparator for comparing the identifier in the data file with the representation of the identifier in the signature file using the computer system is further arranged to alert a user when the identifier in the data file and the representation in the signature file do not match.

21. An apparatus for verifying the authenticity of data as recited in claim 19 wherein the comparator for comparing the identifier in the data file with the representation of the identifier in the signature file using the computer system is further arranged to compare each identifier for each data file with the representation of the identifier in the signature file.

22. An apparatus for verifying the authenticity of data as recited in claim 19 wherein the processor for processing the digital signature is further arranged to verify the digital signature with a signature algorithm.

23. An apparatus for verifying the authenticity of data as recited in claim 22 wherein the signature algorithm is selected from a group consisting of a DSA algorithm, and a combined Message Digest and RSA algorithm.

24. An apparatus for verifying the authenticity of data as recited in claim 19 wherein the identifier in the data file includes at least one of a certificate authority, a site certificate, a software publisher identifier, and a site name, the apparatus further including:
    a mechanism for setting a security level for at least one of the certificate authority, the site certificate, the software publisher identifier, and the site name.

25. An apparatus for verifying the authenticity of data as recited in claim 19 further including a mechanism for establishing a data communication connection with a remote site using the computer system, wherein the mechanism for establishing the data communication connection is arranged to determine whether the site requires a secure connection, and to determine whether a site certificate for the site is valid in response to a determination that a secure connection is required.

26. An apparatus for verifying the authenticity of data as recited in claim 25 wherein the mechanism for establishing the data communication system is further arranged to determine whether the site certificate is trusted in response to a determination that the site certificate is valid.

27. A computer program product for verifying the authenticity of data, the computer program product comprising:
    computer code that receives at least one data file and a signature file, the data file including an identifier, the signature file including a representation of the identifier for the data file and a digital signature;
    computer code that process the signature file using a computer system to determine the authenticity of the signature file, wherein the computer code that processes the signature file further includes computer code that processes the digital signature using the computer system to determine the authenticity of the signature file;
    computer code that compares the identifier in the data file with the representation of the identifier in the signature file using the computer system to determine the authenticity of the data file, wherein the computer code that compares the identifier in the data file with the representation of the identifier in the signature file using the computer system further includes computer code that marks the data file as signed when the identifier in the data file and the representation of the identifier in the signature file match; and
    a computer-readable medium that stores the computer codes.

28. A computer program product as recited in claim 27 wherein the identifier in the data file includes at least one of a certificate authority, a site certificate, a software publisher identifier, and a site name, the computer program product further including computer code that sets a security level for at least one of said certificate authority, said site certificate, said software publisher identifier, and said site name.

29. A computer program product as recited in claim 28 further including computer code for downloading the data file to the computer system, the computer program product further including computer code that brands the applet as verified and computer code that runs the applet when the data file includes an applet and when the digital signature is verified.

30. A computer program product as recited in claim 29 further including computer code for determining whether an unsigned data file is acceptable for execution on the computer, and terminating the applet if an unsigned data file is not acceptable for execution on said computer when the data file comprises an applet, and when the signature is not verified.

31. A computer program product as recited in claim 27 further including computer code for establishing a data communication connection with a remote site using the computer system, computer code for determining whether the site requires a secure connection, and computer code for determining whether a site certificate for the site is valid in response to a determination that a secure connection is required.

32. A computer program product as recited in claim 31 further including computer code for determining whether the site certificate is trusted in response to a determination that the site certificate is valid.

* * * * *